US007093288B1

(12) United States Patent
Hydrie et al.

(10) Patent No.: US 7,093,288 B1
(45) Date of Patent: Aug. 15, 2006

(54) USING PACKET FILTERS AND NETWORK VIRTUALIZATION TO RESTRICT NETWORK COMMUNICATIONS

(75) Inventors: Aamer Hydrie, Kirkland, WA (US);
Galen C. Hunt, Bellevue, WA (US);
Steven P. Levi, Redmond, WA (US);
Bassam Tabbara, Seattle, WA (US);
Robert V. Welland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 600 days.

(21) Appl. No.: 09/695,821

(22) Filed: Oct. 24, 2000

(51) Int. Cl.
*G06F 9/00* (2006.01)
*G06F 15/16* (2006.01)
*G06F 17/00* (2006.01)
*G06F 7/04* (2006.01)
*G06F 7/58* (2006.01)
*G06K 9/00* (2006.01)
*H04L 9/00* (2006.01)
*G06F 15/177* (2006.01)

(52) U.S. Cl. .............................. 726/13; 726/3; 726/11; 726/12; 726/13; 726/14; 726/15; 713/151; 713/162; 709/227; 709/238; 709/244; 709/245

(58) Field of Classification Search ........ 713/200–202, 713/162, 151; 709/245, 244, 227, 238, 229; 370/401, 216, 353; 726/3, 11, 12–15
See application file for complete search history.

(56) References Cited

U.S. PATENT DOCUMENTS

| 5,031,089 A | 7/1991 | Liu et al. |
| 5,220,621 A | 6/1993 | Saitoh |
| 5,430,810 A | 7/1995 | Saeki |
| 5,475,817 A | 12/1995 | Waldo et al. |
| 5,748,958 A | 5/1998 | Badovinatz et al. |
| 5,768,271 A | 6/1998 | Seid et al. |
| 5,801,970 A | 9/1998 | Rowland et al. |
| 5,826,015 A * | 10/1998 | Schmidt ..................... 726/23 |
| 5,845,277 A | 12/1998 | Pfeil et al. |

(Continued)

FOREIGN PATENT DOCUMENTS

EP    0 962 861 A2    12/1999

(Continued)

OTHER PUBLICATIONS

Smith, R. et al., "Distributed Management of Future Global Multi-Service Networks," British Telecommunications Engineering, London, GB, vol. 13, Part 3, Oct. 1, 1994, pp. 221-226.

(Continued)

*Primary Examiner*—Ayaz Sheikh
*Assistant Examiner*—Shih-Hon Chen
(74) *Attorney, Agent, or Firm*—Lee & Hayes, PLLC

(57) ABSTRACT

A network mediator corresponding to a computing device uses packet filters to restrict network communications. The network mediator includes a set of one or more filters, each filter having parameters that are compared to corresponding parameters of a data packet to be passed through the network mediator. The network mediator determines whether to allow the data packet through based on whether the data packet parameters match any filter parameters. The set of filters can be modified by a remote device, but cannot be modified by the computing device whose communications are being restricted. When a data packet is sent from the computing device, the data packet will include the virtual address which is changed to the network address by the network mediator prior to forwarding the packet on the network, and vice versa. By virtualizing the addresses, the computing device is restricted in accessing other devices over the network.

41 Claims, 8 Drawing Sheets

U.S. PATENT DOCUMENTS

| | | | |
|---|---|---|---|
| 5,872,914 | A | 2/1999 | Walker, Jr. et al. |
| 5,895,499 | A | 4/1999 | Chu |
| 5,948,055 | A | 9/1999 | Pulsipher et al. |
| 5,960,371 | A | 9/1999 | Saito et al. |
| 6,047,325 | A * | 4/2000 | Jain et al. .................... 709/227 |
| 6,070,243 | A | 5/2000 | See et al. |
| 6,108,699 | A | 8/2000 | Moiin |
| 6,111,993 | A | 8/2000 | Matsunaga |
| 6,115,393 | A | 9/2000 | Engel et al. |
| 6,125,447 | A | 9/2000 | Gong |
| 6,141,749 | A * | 10/2000 | Coss et al. .................... 713/162 |
| 6,151,688 | A | 11/2000 | Wipfel et al. |
| 6,178,529 | B1 | 1/2001 | Short et al. |
| 6,192,401 | B1 | 2/2001 | Modiri et al. |
| 6,208,345 | B1 | 3/2001 | Sheard et al. |
| 6,212,559 | B1 | 4/2001 | Bixler et al. |
| 6,230,312 | B1 | 5/2001 | Hunt |
| 6,259,448 | B1 | 7/2001 | McNally et al. |
| 6,263,089 | B1 | 7/2001 | Otsuka et al. |
| 6,266,707 | B1 * | 7/2001 | Boden et al. ................ 709/245 |
| 6,311,144 | B1 | 10/2001 | Abu El Ata |
| 6,324,571 | B1 | 11/2001 | Hacherl |
| 6,336,171 | B1 | 1/2002 | Coskrey, IV |
| 6,338,112 | B1 | 1/2002 | Wipfel et al. |
| 6,353,898 | B1 | 3/2002 | Wipfel et al. |
| 6,360,265 | B1 * | 3/2002 | Falck et al. ................. 709/227 |
| 6,366,578 | B1 * | 4/2002 | Johnson ...................... 370/353 |
| 6,389,464 | B1 | 5/2002 | Krishnamurthy et al. |
| 6,393,456 | B1 | 5/2002 | Ambler et al. |
| 6,393,474 | B1 | 5/2002 | Eichert et al. |
| 6,427,163 | B1 | 7/2002 | Arendt et al. |
| 6,449,641 | B1 | 9/2002 | Moiin et al. |
| 6,466,932 | B1 * | 10/2002 | Dennis et al. .................. 707/3 |
| 6,466,978 | B1 | 10/2002 | Mukherjee et al. |
| 6,466,984 | B1 | 10/2002 | Naveh et al. |
| 6,470,332 | B1 | 10/2002 | Weschler |
| 6,480,955 | B1 | 11/2002 | DeKoning et al. |
| 6,484,261 | B1 | 11/2002 | Wiegel |
| 6,487,622 | B1 | 11/2002 | Coskrey, IV et al. |
| 6,493,715 | B1 | 12/2002 | Funk et al. |
| 6,496,187 | B1 | 12/2002 | Deering et al. |
| 6,510,154 | B1 * | 1/2003 | Mayes et al. ................ 370/389 |
| 6,510,509 | B1 * | 1/2003 | Chopra et al. ................ 712/13 |
| 6,519,615 | B1 | 2/2003 | Wollrath et al. |
| 6,529,953 | B1 | 3/2003 | Van Renesse |
| 6,549,516 | B1 * | 4/2003 | Albert et al. ................. 370/236 |
| 6,564,261 | B1 | 5/2003 | Gudjonsson et al. |
| 6,584,499 | B1 | 6/2003 | Jantz et al. |
| 6,587,876 | B1 | 7/2003 | Mahon et al. |
| 6,598,173 | B1 | 7/2003 | Sheikh et al. |
| 6,601,101 | B1 | 7/2003 | Lee et al. |
| 6,606,708 | B1 | 8/2003 | Devine et al. |
| 6,609,148 | B1 * | 8/2003 | Salo et al. .................... 709/217 |
| 6,609,213 | B1 | 8/2003 | Nguyen et al. |
| 6,615,256 | B1 | 9/2003 | van Ingen et al. |
| 6,634,141 | B1 | 10/2003 | Kumar et al. |
| 6,651,101 | B1 | 11/2003 | Gai et al. |
| 6,684,335 | B1 * | 1/2004 | Epstein et al. ............... 713/201 |
| 6,691,168 | B1 * | 2/2004 | Bal et al. ..................... 709/238 |
| 6,694,436 | B1 * | 2/2004 | Audebert ..................... 713/200 |
| 6,717,949 | B1 * | 4/2004 | Boden et al. ................. 370/401 |
| 6,718,379 | B1 | 4/2004 | Krishna et al. |
| 6,728,885 | B1 * | 4/2004 | Taylor et al. ................ 713/201 |
| 6,748,447 | B1 | 6/2004 | Basani et al. |
| 6,754,716 | B1 | 6/2004 | Sharma et al. |
| 6,769,008 | B1 | 7/2004 | Kumar et al. |
| 6,801,528 | B1 | 10/2004 | Nassar |
| 6,801,937 | B1 | 10/2004 | Novaes et al. |
| 6,804,783 | B1 * | 10/2004 | Wesinger et al. ........... 713/200 |
| 6,862,613 | B1 | 3/2005 | Kumar et al. |
| 6,907,395 | B1 | 6/2005 | Hunt et al. |
| 2001/0019554 | A1 | 9/2001 | Nomura et al. |
| 2002/0095524 | A1 | 7/2002 | Sanghvi et al. |
| 2002/0194369 | A1 | 12/2002 | Rawlins et al. |
| 2003/0041139 | A1 | 2/2003 | Beadies et al. |
| 2003/0120763 | A1 | 6/2003 | Volpano |
| 2003/0126230 | A1 | 7/2003 | Donatelli et al. |
| 2003/0154404 | A1 | 8/2003 | Beadies et al. |
| 2003/0206548 | A1 | 11/2003 | Bannai et al. |
| 2004/0054791 | A1 | 3/2004 | Chakraborty et al. |
| 2004/0078787 | A1 | 4/2004 | Borek et al. |

FOREIGN PATENT DOCUMENTS

| | | |
|---|---|---|
| EP | 1 063 815 A2 | 12/2000 |
| WO | WO9963439 | 12/1999 |

OTHER PUBLICATIONS

Somers, F., Ed.—Institute of Electrical and Electronics Engineers: "HYBRID: Unifying Centralised and Distributed Network Management using Intelligent Agents," 1996 IEEE Network Operations and Management Symposium, New York, vol. 1 Symp. 5, Apr. 15, 1996, pp. 34-43.

Webster's Seventh New Collegiate Dictionary, G.C. Merriam Co. Copyright 1971, pp. 438 & 767.

Li, Hsiang-Ling, Chakrabarti, Chaitali; "Hardware Design of a 2-D Motion Estimation System Based on the Hough Transform" IEEE 1998; 16 pages.

Svend Frolund & Pankah Garg, "Design-Time Simulation of a Large-Scale, Distrubuted object System" ACM 1998, p. 374-400.

Liu et al., "Visualization in Network Topology Optimization", ACM, 1992, pp. 131-138.

* cited by examiner

| | 162 ↗ | 164 ↗ | 166 ↗ | 168 ↗ | 170 ↗ | 172 ↗ |
|---|---|---|---|---|---|---|
| | Source Address | Destination Address | Source Port | Destination Port | Protocol | Mapping |
| 174 ↗ | 152.48.72.0 | | 2789 | | UDP | 143.62.79.83 |
| 176 ↗ | | 173.42.68.200 | | | TCP | 143.62.79.82 |
| 178 ↗ | 152.48.0.0 | | | 1312 | TCP | 143.62.79.83 |

160

180 → Value: 10011000001100000000000000000000
182 → Mask: 11111111111111111000000000000000

Fig. 3

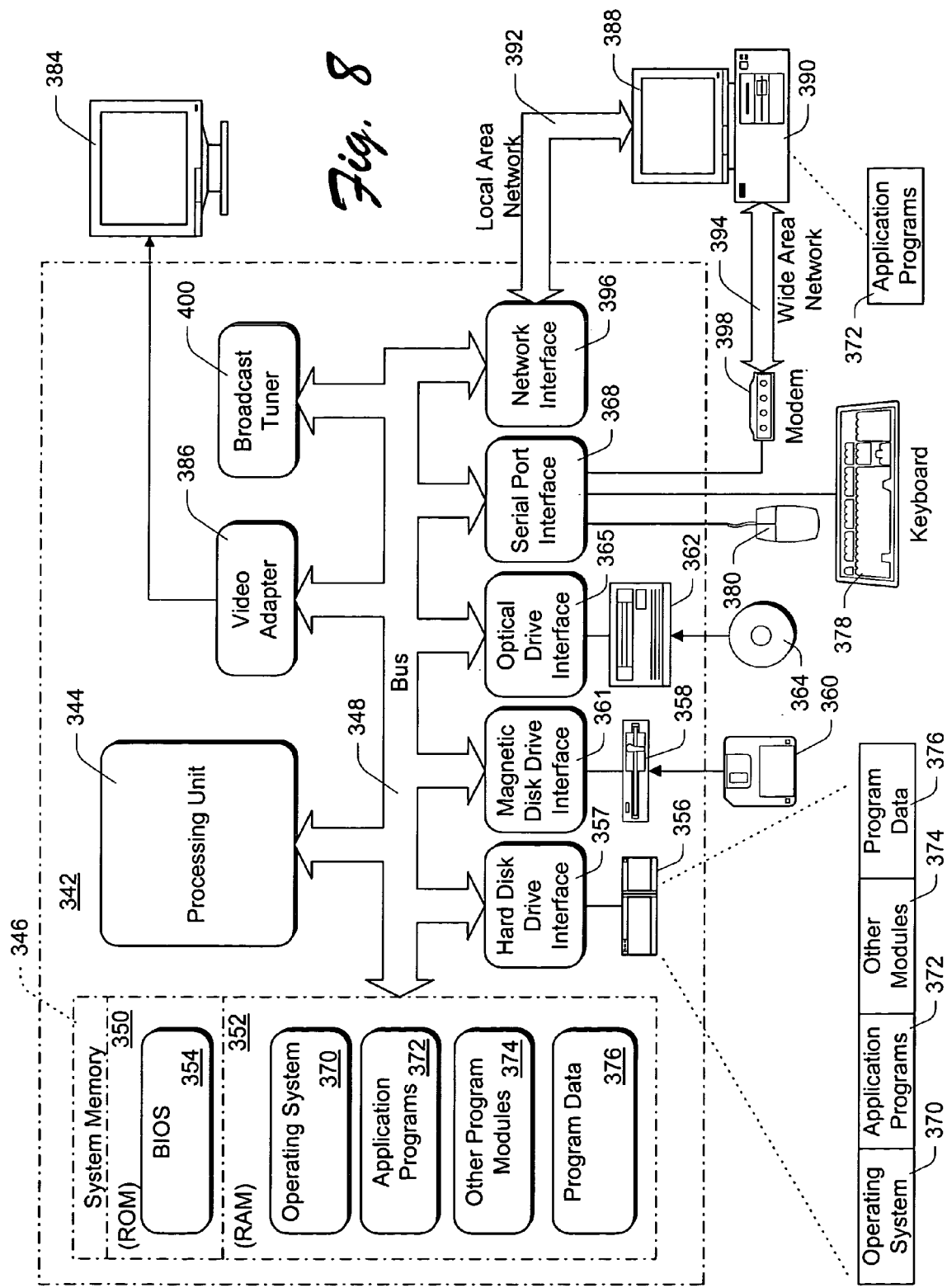

USING PACKET FILTERS AND NETWORK VIRTUALIZATION TO RESTRICT NETWORK COMMUNICATIONS

TECHNICAL FIELD

This invention relates to computer system management. More particularly, the invention relates to using packet filters and network virtualization to restrict network communications.

BACKGROUND OF THE INVENTION

Computers are becoming increasingly interconnected via a wide range of networks, including both public and private networks, such as local area networks (LANs), the Internet, etc. Although such interconnectivity can lead to a number of benefits, so too can it lead to problems. One predominant problem that can arise is that of security, such as how to keep a computer from accessing other computers it should not be accessing, how to keep other computers from accessing your computer, etc.

One specific area in which these security problems can arise is within "co-location facilities". A co-location facility refers to a complex that can house multiple servers, typically coupled to the Internet. The co-location facility typically provides a reliable Internet connection, a reliable power supply, and proper operating environment. The co-location facility also typically includes multiple secure areas (e.g., cages) into which different companies can situate their servers. The particular company is then responsible for managing the operation of the servers in their server cluster. These multiple servers can then operate together to make information available to client computers via the Internet. Security within such a co-location facility, however, is very important. For example, care should be taken to ensure that servers for one company housed at the facility cannot communicate with servers for a competitor's company that are also housed at the facility.

A "firewall" may be used to provide some security for computers. However, firewalls typically operate to shield the outside world (e.g., the public Internet) from the inside world (e.g., an internal private corporate LAN). Such configurations thus do not prevent intra-LAN communications between different computers within the corporate LAN.

Further firewalls (e.g., software firewalls) could also be installed at each computer to provide security. However, current firewalls are typically designed to prevent other computers from accessing the computer that they are installed on, not restrict the computer's ability to access other computers. Some firewalls, particularly those designed for home users, also employ parental controls. Enabling parental controls allows a user of the computer (e.g., a parent) to restrict the ability of that user or others (e.g., children) to access particular World Wide Web sites on the Internet. However, such firewalls that are installed on a computer are typically managed at the computer itself. Thus, the firewalls are susceptible to being bypassed (or otherwise attacked) by a user of the computer. For example, a user may erase or disable the firewall software, a user may load another operating system that can bypass the firewall, etc. Thus, there still exists a need for improved security among interconnected computers.

The invention described below addresses these disadvantages, using packet filters and network virtualization to restrict network communications.

SUMMARY OF THE INVENTION

Using packet filters and network virtualization to restrict network communications is described herein.

According to one aspect, a network mediator corresponding to a computing device uses packet filters to restrict network communications. The network mediator includes a set of one or more filters, each filter having parameters that are compared to corresponding parameters of a data packet to be passed through the network mediator (either from or to the computing device). The network mediator determines whether to allow the data packet to pass through based on whether the data packet parameters match any filter parameters. The set of filters can be modified by a remote device, but cannot be modified by the computing device whose communications are being restricted.

According to another aspect, a network mediator corresponding to a computing device uses network virtualization to restrict network communications. The network mediator maintains a mapping of virtual addresses to network addresses, and allows the computing device to access only the virtual addresses. When a data packet is sent from the computing device, the data packet includes the virtual address which is then changed to the network address by the network mediator prior to forwarding the packet on the network. Similarly, when a data packet is received at the network mediator targeting the computing device, the network mediator changes the network address in the data packet to the corresponding virtual address. By virtualizing the addresses, the computing device is restricted in its knowledge of and ability to access other devices over the network because it has no knowledge of what the other devices' addresses are.

According to another aspect, a network mediator corresponding to a computing device uses packet filters and a multiple managerial level architecture to restrict network communications. The network mediator includes a set of one or more filters, each filter having parameters that are compared to corresponding parameters of a data packet to be passed through the network mediator (either from or to the computing device). The network mediator then determines whether to allow the data packet through based on whether the data packet parameters match any filter parameters. The set of filters can be modified by remote devices at different managerial levels. However, remote devices are prohibited from modifying filters to make the filters less restrictive than filters imposed by higher level devices.

BRIEF DESCRIPTION OF THE DRAWINGS

The present invention is illustrated by way of example and not limitation in the figures of the accompanying drawings. The same numbers are used throughout the figures to reference like components and/or features.

FIG. 3 is a block diagram illustrating an exemplary filter set and exemplary virtualization data in accordance with certain embodiments of the invention.

FIG. 8 shows a general example of a computer that can be used in accordance with certain embodiments of the invention.

DETAILED DESCRIPTION

Figure 1:
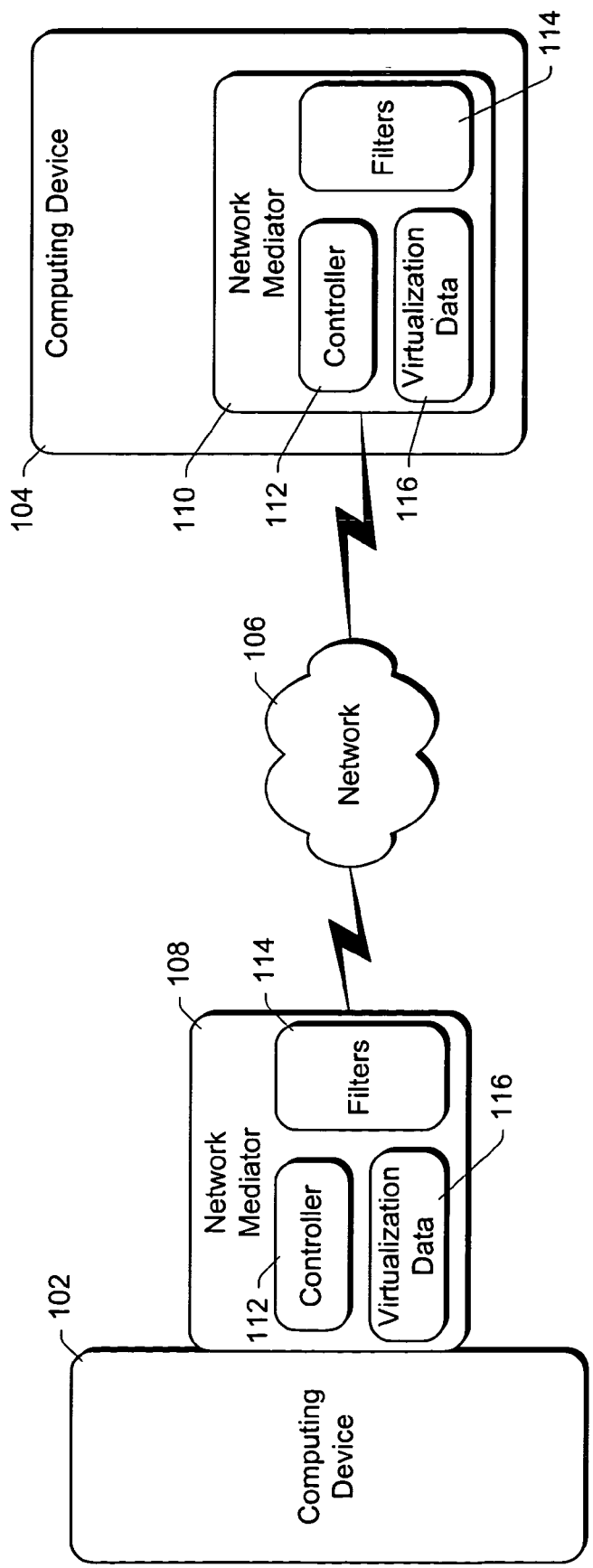
FIG. 1 shows a network environment such as may be used with certain embodiments of the invention.

FIG. 1 shows a network environment such as may be used with certain embodiments of the invention. The network environment in FIG. 1 is illustrated with reference to two computing devices 102 and 104 communicating via a network 106. Only two computing devices are illustrated in FIG. 1 so as not to clutter the drawings. It is to be appreciated that the invention may be used with any number of computing devices coupled together.

Computing devices 102 and 104 communicate with each other over a data communications network 106. Communications network 106 can be any of a variety of networks, including a public network (e.g., the Internet), as well as a private network (e.g., a corporate local area network (LAN) or wide area network (WAN)), or combinations thereof. Communications network 106 can be implemented in any of a variety of different manners, including wired and/or wireless communications media. Communications network 106 can be of any of a wide variety of complexities, ranging from a single wire (e.g., plugged into a jack on each of computing devices 102 and 104) to a complex network including routers, bridges, both wired and wireless media, etc.

Communication over network 106 can be carried out using any of a wide variety of communications protocols. In one implementation, computing devices 102 and 104 can communicate with one another using the Hypertext Transfer Protocol (HTTP), in which World Wide Web pages are hosted by the devices 102 and 104 and written in a markup language, such as the Hypertext Markup Language (HTML) or the eXtensible Markup Language (XML). The World Wide Web (also referred to as simply the "web") is a collection of documents (also referred to as "web pages") that users can view or otherwise render and which typically include links to one or more other pages that the user can access.

Each computing device has a corresponding network mediator that can restrict the ability of the device to communicate with other devices. The network mediator may be a separate component (e.g., a router) coupled to the computing device (e.g., network mediator 108 coupled to computing device 102) or alternatively included as part of the computing device (e.g., network mediator 110 included in computing device 104). Network mediators 108 and 110 can be implemented in any of a variety of manners, including software, firmware, hardware, or combinations thereof.

Network mediator 110 can be implemented within computing device 104 in any of a variety of manners. By way of example, network mediator 110 may be implemented on a network interface card (NIC) of device 104, thereby allowing filtering to occur at the point where network communications flow into and out of device 104. By way of another example, computing device 104 may include a processor(s) that supports multiple privilege levels (e.g., rings in an x86 architecture processor). The multiple rings provide a set of prioritized levels that software can execute at, often including 4 levels (Rings 0, 1, 2, and 3). Ring 0 is typically referred to as the most privileged ring. Software processes executing in Ring 0 can typically access more features (e.g., instructions) than processes executing in less privileged Rings. Furthermore, a processor executing in a particular Ring cannot alter code or data in a higher priority ring. Thus, network mediator 110 can be implemented to execute in Ring 0, while other software applications (including the operating system) execute in lower priority rings (e.g., Rings 1, 2, and/or 3). Thus, network mediator 110 is able to shield itself from other software applications, preventing those applications from modifying mediator 110 (e.g., by a rogue or malicious program trying to subvert the restrictions imposed by network mediator 110).

Each network mediator 108 and 110 includes a controller 112, a set of one or more filters 114, and optionally virtualization data 116. Controller 112 is the access point for the network mediator. Data packets desiring to be sent from or received at the corresponding computing device pass through controller 112, as do any requests to modify filters 114 or virtualization data 116.

Filters 114 are a set of one or more filters that impose restrictions on the ability of the corresponding computing device to transmit data packets to and/or receive data packets from other computing devices. Upon receipt of a data packet, controller 112 accesses filters 114 to determine whether one or more of filters 114 indicate that the data packet cannot be sent to (if the corresponding computing device is attempting to send the data packet) the targeted device or received from (if the corresponding computing device is the targeted device of the data packet) the source device. If the data packet cannot be sent to the targeted device (or received from the source device), then controller 112 refuses to let the data packet through and drops the data packet. Alternatively, a message may be returned to the source of the data packet informing the source that it cannot send the desired packet.

Virtualization data 116 includes the data to map virtual addresses to network addresses. Although illustrated as separate from filters 114, virtualization data 116 may alternatively be incorporated into filters 114. The network address of a device on network 106 uniquely identifies the device (or group of devices) on network 106 and can be used by other devices to send data packets to that device(s). The format of the network address can vary based on the protocol(s) used by network 106 (e.g., if the Internet Protocol (IP) is supported by network 106, then the network addresses can be 32-bit IP addresses).

In embodiments using virtual addresses, a computing device uses virtual addresses to identify other computing devices. These virtual addresses uniquely identify other devices within a particular computing device, but can have no relationship to the actual network address for those other devices. The virtual addresses thus are relatively useless outside of the computing device (and network mediator). When a data packet is to be sent to another computing device, network mediator uses virtualization data 116 to map the virtual address to the correct network address for the targeted computing device so that the data packet can be communicated to the targeted computing device. Similarly, when a data packet received from another computing device targeting the computing device corresponding to the network mediator, the network mediator uses virtualization data 116 to map the network address to the correct virtual address for the source computing device.

The virtual addresses used by a computing device can be generated in any of a variety of manners. By way of example, they may be generated randomly or in accordance with some predetermined (or dynamic) algorithm. The virtual addresses for a computing device can be generated by the network mediator corresponding to that device, or alternatively some other device or component coupled to the network mediator (e.g., via network 106).

Controller 112 restricts filters 114 and virtualization data 116 to being managed only from one or more remote devices. Controller 112 prevents the computing device that the network mediator corresponds to from modifying the filters 114 and virtualization data 116 (e.g., prevents the computing device from adding filters or virtualization data, removing filters or virtualization data, modifying filters or virtualization data, etc.). Thus, the computing device that is having its communication restricted by the network mediator does not have the authority to alter any of the filters 114 or virtualization data 116 being used to impose those restrictions.

Restricting managerial control to only remote devices can be implemented in a variety of different manners. In one implementation, the network mediator does not expose an interface to the corresponding computing device to allow the computing device to make any requests to change the filters 114 or virtualization data 116. The network mediator allows only authorized remote devices (e.g., only devices with particular addresses and/or that can authenticate themselves using an identifier and a password) to modify filters 114 and data 116. The network mediator can be initialized to accept management commands from only a particular authorized device (or user id), which in turn can configure network mediator to authorize additional devices (or user id's) to manage the network mediator. Furthermore, the filters 114 and data 116 can be stored by network mediator in a protected area (e.g., memory or registers that are encrypted and/or require device (or user) verification to access it). Such storage in a protected area prevents any device from bypassing any authentication procedures imposed by the network mediator.

Controller 112 may also optionally maintain a log or other record (not shown) of data packets that were not allowed to pass through the network mediator. This record may be a copy of the entire data packet, or alternatively only selected parts of the data packet (e.g., source and/or destination address, data packet protocol, etc.). Additional information may also be maintained, such as a timestamp indicating the date and time the data packet was received, which filter was the cause of the refusal to allow the packet through, etc. Such information can then be used for a variety of different purposes. For example, the information could be examined to try to identify if a malicious user or program is attempting to break into a particular computing device(s), or to identify an improperly functioning program that, due to an error in the program, is attempting to access computing devices it should not be (e.g., during a debugging process), etc.

Controller 112 also supports a multiple-level restriction administration scheme. In support of such a scheme, controller 112 allows different remote devices to have different managerial levels, and prevents devices at lower-level managerial levels from modifying filters 114 in a manner that could result in a violation of a filter imposed by a higher-level managerial level (or changing of virtualization data 116 established by a higher-level managerial level).

Figure 2:
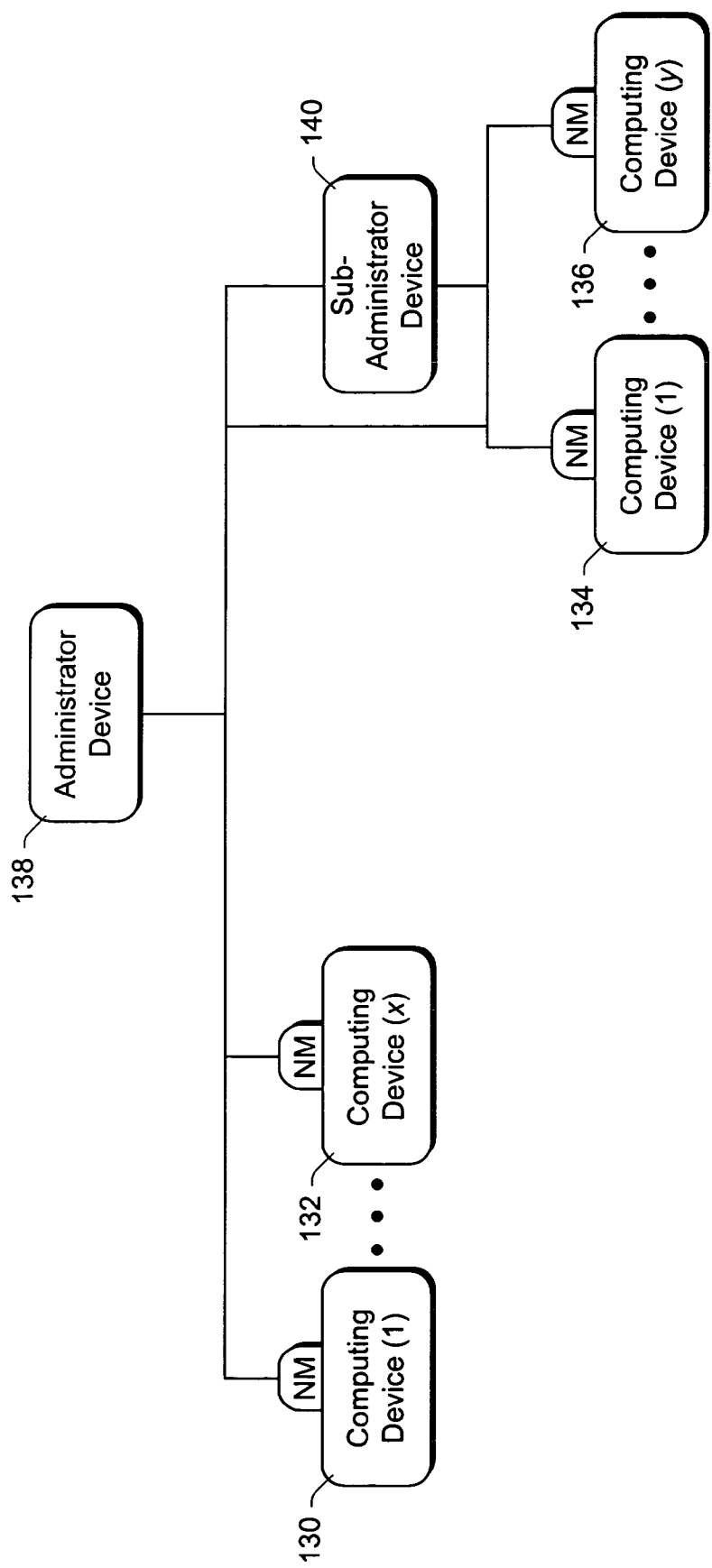
FIG. 2 is a block diagram illustrating a multiple-level filter administration scheme in accordance with certain embodiments of the invention.

FIG. 2 is a block diagram illustrating a multiple-level filter administration scheme in accordance with certain embodiments of the invention. Multiple different computing devices 130, 132, 134, and 136 are illustrated, each with a corresponding network mediator (NM). Two different managerial levels are illustrated in FIG. 2, one being higher level with management being handled from administrator device 138 and another being lower level with management being handled from sub-administrator device 140. Although illustrated as two separate devices 138 and 140, multiple managerial levels may alternatively be implemented using a single device but different user identifications (with the network mediator verifying authenticity of the user rather than the device).

Administrator device 138, being the highest level managerial device, can modify filters 114 and virtualization data 116 for any of the network mediators corresponding to the computing devices 130–136. Sub-administrator device 140, however, is of a lower managerial level than administrator device 138, and can manage network mediators corresponding to devices 134 and 136, but not network mediators corresponding to devices 130 and 132. Thus, the network mediators for devices 134 and 136 are subject to management from multiple managerial levels, while the network mediators for devices 130 and 132 are subject to management from only a single managerial level. Sub-administrator device 140 can modify filters 114 and virtualization data 116 in network mediators corresponding to devices 134 and 136, but only so long as they do not conflict with (e.g., would result in a violation of) modifications previously made by administrator device 138. Any change by a lower managerial level device (or user) of a virtual address previously established (or modified) by a higher managerial level device (or user) would be such a violation. Two filters conflict with each other if the filter added (or modified) by the higher managerial level device (or user) is more restrictive than the filter added (or modified) by the lower managerial level. A first filter that allows any type of access that is not allowed by a second filter is said to be less restrictive than the second filter. By way of example, a first filter may allow communications to be sent to a device at a target address only of a particular protocol, while a second filter may allow communications to be sent to the device at the target address using any protocol. In this example, the second filter would be less restrictive than the first filter. Note, however, that two filters are not in conflict with each other if the filter added (or modified) by the lower managerial level device (or user) is less restrictive than the filter added by the higher managerial level device (or user).

Administrator device 138 and sub-administrator device 140 are merely the devices via which management commands are issued to the computing devices 130–136. Management commands may also be issued from other devices, and multiple devices may exist that can issue management commands for the same management level (e.g., multiple administrator devices 138 operating at the highest managerial level may exist). Although not illustrated in FIG. 2, devices 138 and 140 may be computing devices analogous to devices 102 and 104 of FIG. 1, with corresponding network mediators themselves. By way of example, sub-administrator device 140 may have a network mediator that can be managed by administrator device 138 to restrict device 140 to communicating only with devices 134, 136, and 138 (and in this manner preventing sub-administrator device 140 from issuing management commands to devices 130 and 132).

In order to prevent lower-level restrictions from being imposed which would violate higher-level restrictions, each network mediator maintains an identification of which level imposed each filter (or mapping). This identification may be direct (e.g., an indicator associated with each filter identifying a particular managerial level) or alternatively indirect (e.g., different data structures may be established for different managerial levels).

Situations can arise where a filter added by a higher-level device is in conflict with a filter previously added by a lower-level device. These situations can be resolved in different manners. In one implementation, the network mediator compares a new filter (newly added or newly changed) to all previously imposed filters. If the new filter conflicts with any previously imposed lower-level filter, then the previously imposed lower-level filter is deleted. In another implementation, the network mediator maintains filters from different managerial levels in different structures (e.g., tables). Thus, during the filtering process, the network mediator controller can compare the data packet to the filters on a table-by-table basis (e.g., so a restriction imposed by a higher managerial level will cause the data packet to be dropped before a table including lower managerial level filters is accessed (and so the less restrictive lower level filter would never get the chance to allow the data packet to pass through)).

FIG. 3 is a block diagram illustrating an example filter set and virtualization data in accordance with certain embodiments of the invention. The filter set and virtualization data 160 of FIG. 3 are discussed with additional reference to components in FIG. 1. Although the filter set and virtualization data 160 are illustrated in a table format for ease of illustration, it is to be appreciated that filters and virtualization data 160 can be maintained at a network mediator 108 or 110 using any of a wide variety of conventional data structures. Furthermore, the filter set and virtualization data 160 are illustrated with reference to Internet Protocol (IP) data packet filtering. Alternatively, data packets can be filtered for different protocols, with the parameters of the filters varying based on the protocol (e.g., there would be no port parameters if the protocol did not support ports).

Filter set and virtualization data 160 includes multiple parameters or fields, one or more of which may be filled in for a particular filter. The fields include: a source address field 162, a destination address field 164, a source port field 166, a destination port field 168, a protocol field 170, and a mapping field 172. Each one of the fields 162–170 can identify a particular filter parameter for the corresponding filter. These filter parameters for a filter are then compared to the corresponding parameters of a data packet to determine whether the packet satisfies the filter. A data packet satisfies a filter if the filter parameters match (are the same as) the corresponding parameters of the data packet. Also, in the illustrated example filter set and virtualization data 160, each of the filters 174, 176, and 178 is a "permissive" filter—a packet received at the network mediator that satisfies one of these filters will be passed through to its destination (and will be dropped if it does not satisfy any of the filters). Alternatively, filter set and virtualization data 160 could include only "exclusionary" filters (that is, any packet received at the network mediator that satisfies one of the filters will be dropped; otherwise, the packet will be allowed through to its destination), or a combination of permissive and exclusionary filters.

In the illustrated example filter 174, any data packet received by the network mediator (targeting the corresponding computing device) from another computing device having a source address of "152.48.72.0", a source port of "2789", and using the UDP (User Datagram Protocol) protocol will be allowed through to the corresponding computing device. Additionally, mapping field 172 indicates to controller 112 to change the source address of "152.48.72.0" to "143.62.79.83" in the data packet before forwarding the data packet on to the computing device (or another portion of the computing device) for processing.

Similarly, filter 176 indicates that any data packet requested to be sent to a target computing device by the computing device corresponding to the network mediator can be sent if the target device address (the destination address) is "173.42.68.200" and uses the TCP (Transmission Control Protocol) protocol. If the data packet satisfies these parameters, then mapping filed 172 indicates to controller 112 to change the destination address in the data packet to "143.62.79.82" prior to forwarding the data packet to the targeted device.

The parameters for fields 162–170 may also employ "wild cards", which allow at least a portion of a parameter to match anything. Wild cards can be implemented in any of a wide variety of manners, and in the illustrated example are implemented using a value and corresponding mask. The value 180 and mask 182 for destination address field 164 of filter 178 are illustrated by way of example in FIG. 3. The address stored in field 164 of filter 178 ("152.48.0.0") is stored as a 32-bit value 180. Each of the 32 bits has a corresponding bit in the 32-bit mask value 182. For each bit of value 180, the corresponding mask bit in mask value 182 indicates whether that bit must match in the data packet to satisfy the filter. For each bit in mask value 182 that is set (e.g., has a value of "1"), the corresponding bit in value 180 must match in the data packet to satisfy the filter, and for each bit in mask value 182 that is not set (e.g., has a value of "0"), the corresponding bit in value 180 need not match in the data packet to satisfy the filter. Thus, in the illustrated example, the first sixteen bits of value 180 (corresponding to "152.48") must match the corresponding field of the data packet in order to satisfy the filter, although the remaining sixteen bits do not (therefore, the values "0.0" can basically be ignored). Thus, by way of example, if the data packet had a destination address of "152.48.137.72", then the data packet would satisfy the filter (assuming the data packet also had a destination port of 1312 and used the TCP protocol). However, if the data packet had a destination address of "148.39.152.48", then the data packet would not satisfy the filter (regardless of the values in its destination port and protocol fields).

Various modifications can be made to filter set and virtualization data 160. By way of example, mapping field 172 may be separate from the filter fields 162–170 (e.g., stored in a separate table or other data structure). By way of another example, an additional indication (not shown) may be included for one or more filters to indicate whether the filter corresponds to incoming data packets (those packets targeting the computing device corresponding to the network mediator) or outgoing data packets (those packets which are trying to be sent from the computing device corresponding to the network mediator). By way of another example, an additional indication (not shown) may be included for one or more filters to indicate a particular device (or managerial) level that implemented the filter (e.g., device 138 or 140 of FIG. 2).

Figure 4:
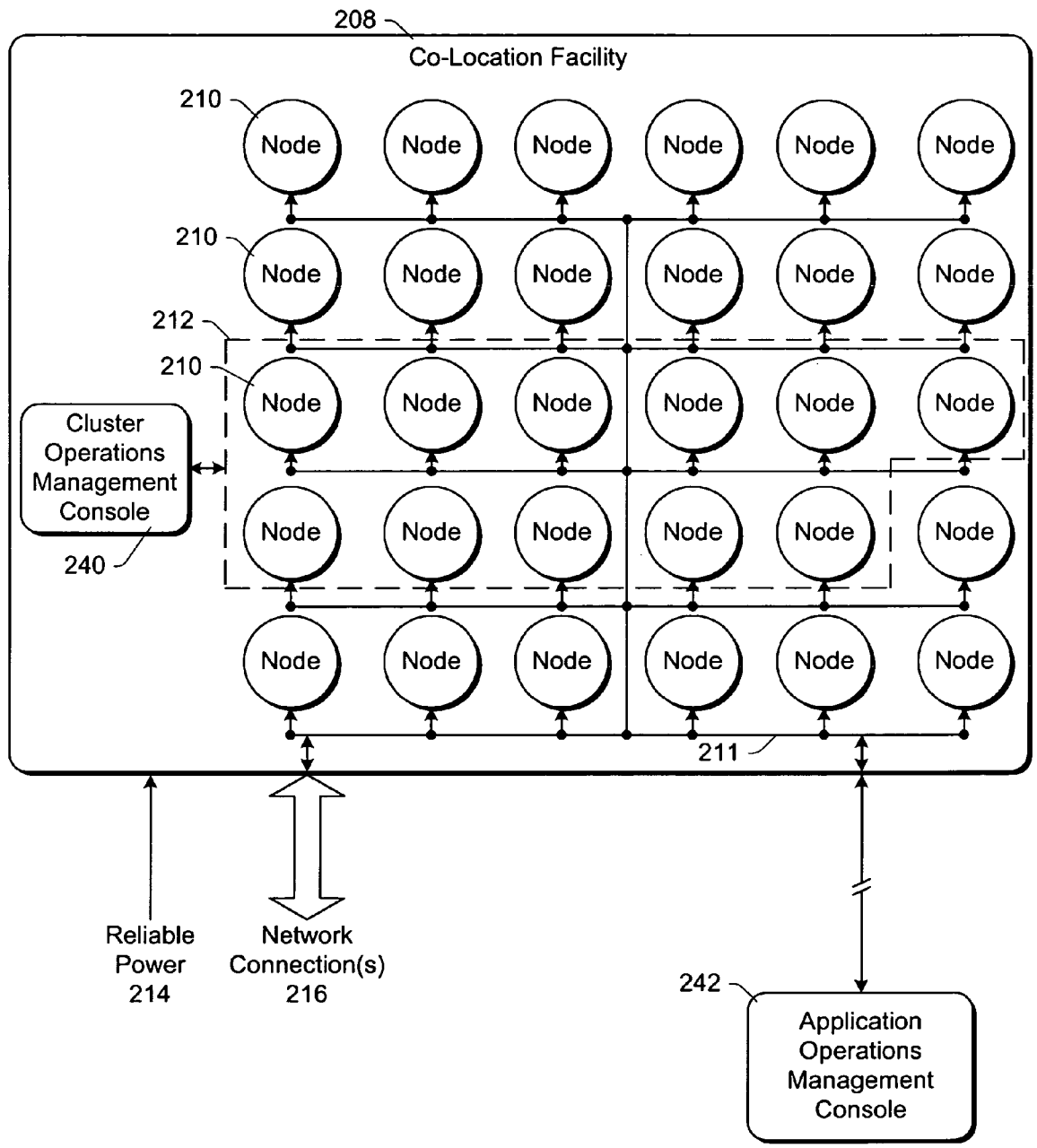
FIG. 4 is a block diagram illustrating an exemplary co-location facility that can include certain embodiments of the invention.

FIG. 4 is a block diagram illustrating an exemplary co-location facility that can include certain embodiments of the invention. Co-location facility 208 is illustrated including multiple nodes (also referred to as server computers)

210. Each one of these nodes 210 can be a computing device 102 or 104 of FIG. 1, and includes a corresponding network mediator. Co-location facility 208 can include any number of nodes 210, and can easily include an amount of nodes numbering into the thousands.

The nodes 210 are grouped together in clusters, referred to as server clusters (or node clusters). For ease of explanation and to avoid cluttering the drawings, only a single cluster 212 is illustrated in FIG. 4. Each server cluster includes nodes 210 that correspond to a particular customer of co-location facility 208. The nodes 210 of a server cluster are physically isolated from the nodes 210 of other server clusters. This physical isolation can take different forms, such as separate locked cages or separate rooms at co-location facility 208. Physically isolating server clusters ensures customers of co-location facility 208 that only they can physically access their nodes (other customers cannot).

A landlord/tenant relationship (also referred to as a lessor/lessee relationship) can also be established based on the nodes 210. The owner (and/or operator) of co-location facility 208 owns (or otherwise has rights to) the individual nodes 210, and thus can be viewed as a "landlord". The customers of co-location facility 208 lease the nodes 210 from the landlord, and thus each can be viewed as a "tenant". The landlord is typically not concerned with what types of data or programs are being stored at the nodes 210 by the tenant, but does impose boundaries on the clusters that prevent nodes 210 from different clusters from communicating with one another, as discussed in more detail below.

Although physically isolated, nodes 210 of different clusters are often physically coupled to the same transport medium (or media) 211 that enables access to network connection(s) 216, and possibly application operations management console 242, discussed in more detail below. This transport medium can be wired or wireless.

As each node 210 can be coupled to a shared transport medium 211, each node 210 is configurable to restrict which other nodes 210 data packets can be sent to or received from. Given that a number of different nodes 210 may be included in a tenant's server cluster, the tenant may want to be able to pass data between different nodes 210 within the cluster for processing, storage, etc. However, the tenant will typically not want data to be passed to other nodes 210 that are not in the server cluster. Configuring each node 210 in the cluster to restrict which other nodes 210 data packets can be sent to or received from allows a boundary for the server cluster to be established and enforced. Establishment and enforcement of such server cluster boundaries prevents tenant data from being erroneously or improperly forwarded to a node that is not part of the cluster.

These initial boundaries established by the landlord prevent communication between nodes 210 of different tenants, thereby ensuring that each tenant's data can be passed only to other nodes 210 of that tenant. The tenant itself may also further define sub-boundaries within its cluster, establishing sub-clusters of nodes 210 that data cannot be communicated out of (or in to) either to or from other nodes in the cluster. The tenant is able to add, modify, remove, etc. such sub-cluster boundaries at will, but only within the boundaries defined by the landlord (that is, the cluster boundaries). Thus, the tenant is not able to alter boundaries in a manner that would allow communication to or from a node 210 to extend to another node 210 that is not within the same cluster.

Co-location facility 208 supplies reliable power 214 and reliable network connection(s) 216 to each of the nodes 210. Power 214 and network connection(s) 216 are shared by all of the nodes 210, although alternatively separate power 214 and network connection(s) 216 may be supplied to nodes 210 or groupings (e.g., clusters) of nodes. Any of a wide variety of conventional mechanisms for supplying reliable power can be used to supply reliable power 214, such as power received from a public utility company along with backup generators in the event of power failures, redundant generators, batteries, fuel cells, or other power storage mechanisms, etc. Similarly, any of a wide variety of conventional mechanisms for supplying a reliable network connection can be used to supply network connection(s) 216, such as redundant connection transport media, different types of connection media, different access points (e.g., different Internet access points, different Internet service providers (ISPs), etc.).

Management of each node 210 is carried out in a multiple-tiered manner. The multi-tiered architecture includes three tiers: a cluster operations management tier, an application operations management tier, and an application development tier. The cluster operations management tier is implemented locally at the same location as the node(s) being managed (e.g., at a co-location facility) and involves managing the hardware operations of the node(s). The cluster operations management tier is not concerned with what software components are executing on the nodes 210, but only with the continuing operation of the hardware of nodes 210 and establishing any boundaries between clusters of nodes.

The application operations management tier, on the other hand, is implemented at a remote location other than where the server(s) being managed are located (e.g., other than the co-location facility), but from a client computer that is still communicatively coupled to the server(s). The application operations management tier involves managing the software operations of the server(s) and defining sub-boundaries within server clusters. The client can be coupled to the server(s) in any of a variety of manners, such as via the Internet or via a dedicated (e.g., dial-up) connection. The client can be coupled continually to the server(s), or alternatively sporadically (e.g., only when needed for management purposes).

The application development tier is implemented on another client computer at a location other than the server(s) (e.g., other than at the co-location facility) and involves development of software components or engines for execution on the server(s). Alternatively, current software on a node 210 at co-location facility 208 could be accessed by a remote client to develop additional software components or engines for the node. Although the client at which application development tier is implemented is typically a different client than that at which application operations management tier is implemented, these tiers could be implemented (at least in part) on the same client.

Co-location facility 208 includes a cluster operations management console for each server cluster. In the example of FIG. 4, cluster operations management console 240 corresponds to cluster 212. Cluster operations management console 240 implements the cluster operations management tier for cluster 212 and is responsible for managing the hardware operations of nodes 210 in cluster 212. Cluster operations management console 240 monitors the hardware in cluster 212 and attempts to identify hardware failures. Any of a wide variety of hardware failures can be monitored for, such as processor failures, bus failures, memory failures, etc. Hardware operations can be monitored in any of a variety of manners, such as cluster operations management console 240 sending test messages or control signals to the nodes 210 that require the use of particular hardware in order to respond (no response or an incorrect response indicates failure), having messages or control signals that require the use of particular hardware to generate periodically sent by nodes 210 to cluster operations management console 240 (not receiving such a message or control signal within a specified amount of time indicates failure), etc. Alternatively, cluster operations management console 240 may make no attempt to identify what type of hardware failure has occurred, but rather simply that a failure has occurred.

Once a hardware failure is detected, cluster operations management console 240 acts to correct the failure. The action taken by cluster operations management console 240 can vary based on the hardware as well as the type of failure, and can vary for different server clusters. The corrective action can be notification of an administrator (e.g., a flashing light, an audio alarm, an electronic mail message, calling a cell phone or pager, etc.), or an attempt to physically correct the problem (e.g., reboot the node, activate another backup node to take its place, etc.).

Cluster operations management console 240 also establishes cluster boundaries within co-location facility 208 by adding filters to the network mediator corresponding to each node 210 that allows the node to communicate only with other nodes in its cluster. The cluster boundaries established by console 240 prevent nodes 210 in one cluster (e.g., cluster 212) from communicating with nodes in another cluster (e.g., any node not in cluster 212), while at the same time not interfering with the ability of nodes 210 within a cluster from communicating with other nodes within that cluster. These boundaries provide security for the tenants' data, allowing them to know that their data cannot be communicated to other tenants' nodes 210 at facility 208 even though network connection 216 may be shared by the tenants.

In the illustrated example, each cluster of co-location facility 208 includes a dedicated cluster operations management console. Alternatively, a single cluster operations management console may correspond to, and manage hardware operations of, multiple server clusters. According to another alternative, multiple cluster operations management consoles may correspond to, and manage hardware operations of, a single server cluster. Such multiple consoles can manage a single server cluster in a shared manner, or one console may operate as a backup for another console (e.g., providing increased reliability through redundancy, to allow for maintenance, etc.).

An application operations management console 242 is also communicatively coupled to co-location facility 208. Application operations management console 242 is located at a location remote from co-location facility 208 (that is, not within co-location facility 208), typically being located at the offices of the customer. A different application operations management console 242 corresponds to each server cluster of co-location facility 208, although alternatively multiple consoles 242 may correspond to a single server cluster, or a single console 242 may correspond to multiple server clusters. Application operations management console 240 implements the application operations management tier for cluster 212 and is responsible for managing the software operations of nodes 210 in cluster 212 as well as securing sub-boundaries within cluster 212. Application operations management console 240 can create, modify, and remove sub-boundaries by modifying the filter set in the network mediator corresponding to each node in the cluster to allow communication only with the desired nodes.

Application operations management console 242 monitors the software in cluster 212 and attempts to identify software failures. Any of a wide variety of software failures can be monitored for, such as application processes or threads that are "hung" or otherwise non-responsive, an error in execution of application processes or threads, etc. Software operations can be monitored in any of a variety of manners (similar to the monitoring of hardware operations discussed above), such as application operations management console 242 sending test messages or control signals to particular processes or threads executing on the nodes 210 that require the use of particular routines in order to respond (no response or an incorrect response indicates failure), having messages or control signals that require the use of particular software routines to generate periodically sent by processes or threads executing on nodes 210 to application operations management console 242 (not receiving such a message or control signal within a specified amount of time indicates failure), etc. Alternatively, application operations management console 242 may make no attempt to identify what type of software failure has occurred, but rather simply that a failure has occurred.

Once a software failure is detected, application operations management console 242 acts to correct the failure. The action taken by application operations management console 242 can vary based on the hardware as well as the type of failure, and can vary for different server clusters. The corrective action can be notification of an administrator (e.g., a flashing light, an audio alarm, an electronic mail message, calling a cell phone or pager, etc.), or an attempt to correct the problem (e.g., reboot the node, re-load the software component or engine image, terminate and re-execute the process, etc.).

Thus, the management of a node 210 is distributed across multiple managers, regardless of the number of other nodes (if any) situated at the same location as the node 210. The multi-tiered management allows the hardware operations management to be separated from the application operations management, allowing two different consoles (each under the control of a different entity) to share the management responsibility for the node.

Figure 5:
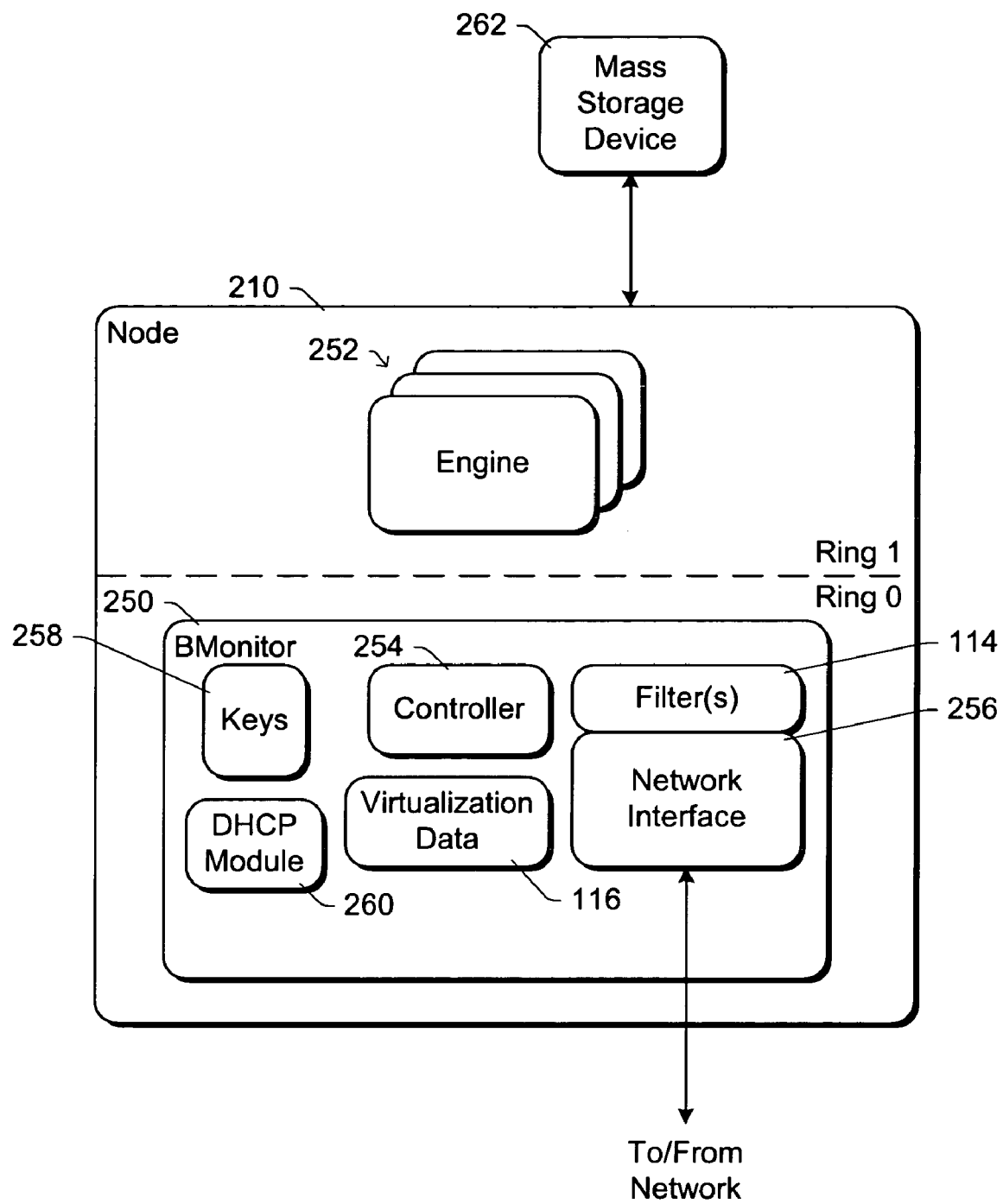
FIG. 5 is a block diagram illustrating an exemplary node of a co-location facility in more detail in accordance with certain embodiments of the invention.

FIG. 5 is a block diagram illustrating an exemplary node of a co-location facility in more detail in accordance with certain embodiments of the invention. Node 210 includes a monitor 250, referred to as the "BMonitor", and a plurality of software components or engines 252, and is coupled to (or alternatively incorporates) a mass storage device 262. In the illustrated example of FIG. 5, BMonitor 250 acts as network mediator 108 or 110 of FIG. 1.

In FIG. 5, node 210 is a server computer having a processor(s) that supports multiple privilege levels (e.g., rings in an x86 architecture processor). In the illustrated example, these privilege levels are referred to as rings, although alternate implementations using different processor architectures may use different nomenclature. The multiple rings provide a set of prioritized levels that software can execute at, often including 4 levels (Rings 0, 1, 2, and 3), with Ring 0 being the most privileged ring. In the illustrated example, BMonitor 250 executes in Ring 0, while engines 252 execute in Ring 1 (or alternatively Rings 2 and/or 3). Thus, the code or data of BMonitor 250 (executing in Ring 0) cannot be altered directly by engines 252 (executing in Ring 1). Rather, any such alterations would have to be made by an engine 252 requesting BMonitor 250 to make the alteration (e.g., by sending a message to BMonitor 250, invoking a function of BMonitor 250, etc.). Implementing BMonitor 250 in Ring 0 protects BMonitor 250 from a rogue or malicious engine 252 that tries to bypass any restrictions imposed by BMonitor 250.

BMonitor 250 is the fundamental control module of node 210—it controls (and optionally includes) both the network interface card and the memory manager. By controlling the network interface card (which may be separate from BMonitor 250, or alternatively BMonitor 250 may be incorporated on the network interface card), BMonitor 250 can control data received by and sent by node 210. By controlling the memory manager, BMonitor 250 controls the allocation of memory to engines 252 executing in node 210 and thus can assist in preventing rogue or malicious engines from interfering with the operation of BMonitor 250.

Although various aspects of node 210 may be under control of BMonitor 250 (e.g., the network interface card), BMonitor 250 still makes at least part of such functionality available to engines 252 executing on the node 210. BMonitor 250 provides an interface (e.g., via controller 254 discussed in more detail below) via which engines 252 can request access to the functionality, such as to send data out to another node 210 or to the Internet. These requests can take any of a variety of forms, such as sending messages, calling a function, etc.

BMonitor 250 includes controller 254 (performing the functions of controller 112 of FIG. 1), one or more filters 114, virtualization data 116, network interface 256, one or more keys 258, and a Distributed Host Control Protocol (DHCP) module 260. Network interface 256 provides the interface between node 210 and the network (e.g., network connections 216 of FIG. 4) via the internal transport medium 211 of co-location facility 104. Filters 114 identify other nodes 210 and possibly other sources or targets (e.g., coupled to network 106 of FIG. 1) that data can (or alternatively cannot) be sent to and/or received from. The nodes or other sources/targets can be identified in any of a wide variety of manners, such as by network address (e.g., Internet Protocol (IP) address), some other globally unique identifier, a locally unique identifier (e.g., a numbering scheme proprietary or local to co-location facility 208), etc.

Filters 114 can fully restrict access to a node (e.g., no data can be received from or sent to the node), or partially restrict access to a node. Partial access restriction can take different forms. For example, a node may be restricted so that data can be received from the node but not sent to the node (or vice versa). By way of another example, a node may be restricted so that only certain types of data (e.g., communications in accordance with certain protocols, such as HTTP) can be received from and/or sent to the node. Filtering based on particular types of data can be implemented in different manners, such as by communicating data in packets with header information that indicate the type of data included in the packet.

Filters 114 can be added by application operations management console 242 or cluster operations management console 240 of FIG. 4. In the illustrated example, filters added by cluster operations management console 240 (to establish cluster boundaries) restrict full access to nodes (e.g., any access to another node can be prevented) whereas filters added by application operations management console 242 (to establish sub-boundaries within a cluster) can restrict either full access to nodes or partial access.

Controller 254 also imposes some restrictions on what filters can be added to filters 114. In the illustrated example, controller 254 allows cluster operations management console 240 to add any filters it desires (which will define the boundaries of the cluster). However, controller 254 restricts application operations management console 242 to adding only filters that are at least as restrictive as those added by console 240. If console 242 attempts to add a filter that is less restrictive than those added by console 240 (in which case the sub-boundary may extend beyond the cluster boundaries), controller 254 refuses to add the filter (or alternatively may modify the filter so that it is not less restrictive). By imposing such a restriction, controller 254 can ensure that the sub-boundaries established at the application operations management level do not extend beyond the cluster boundaries established at the cluster operations management level.

DHCP module 260 implements the Distributed Host Control Protocol, allowing BMonitor 250 (and thus node 210) to obtain an IP address from a DHCP server (e.g., cluster operations management console 240 of FIG. 4). During an initialization process for node 210, DHCP module 260 requests an IP address from the DHCP server, which in turn provides the IP address to module 260. Additional information regarding DHCP is available from Microsoft Corporation of Redmond, Wash.

Software engines 252 include any of a wide variety of conventional software components. Examples of engines 252 include an operating system (e.g., the Windows NT® operating system), a load balancing server component (e.g., to balance the processing load of multiple nodes 210), a caching server component (e.g., to cache data and/or instructions from another node 210 or received via the Internet), a storage manager component (e.g., to manage storage of data from nodes 210 received via the Internet), etc. In one implementation, each of the engines 252 is a protocol-based engine, communicating with BMonitor 250 and other engines 252 via messages and/or function calls without requiring the engines 252 and BMonitor 250 to be written using the same programming language.

Controller 254 may optionally be further responsible for controlling the execution of engines 252. This control can take different forms, including beginning execution of an engine 252, terminating execution of an engine 252, reloading an image of an engine 252 from a storage device, etc. Controller 254 receives instructions from application operations management console 242 of FIG. 4 regarding which of these control actions to take and when to take them. Thus, the control of engines 252 is actually managed by the remote application operations management console 242, not locally at co-location facility 208. Controller 254 also provides an interface via which application operations management console 242 can identify filters to add (and/or remove) from filter set 114.

Controller 254 also includes an interface via which cluster operations management console 240 of FIG. 4 can communicate commands to controller 254. Different types of hardware operation oriented commands can be communicated to controller 254 by cluster operations management console 240, such as re-booting the node, shutting down the node, placing the node in a low-power state (e.g., in a suspend or standby state), etc.

Controller 254 further optionally provides encryption support for BMonitor 250, allowing data to be stored securely on mass storage device 262 (e.g., a magnetic disk, an optical disk, etc.) and secure communications to occur between node 210 and an operations management console (e.g., console 240 or 242 of FIG. 4). Controller 254 maintains multiple encryption keys 258, which can include a variety of different keys such as symmetric keys (secret keys used in secret key cryptography), public/private key pairs (for public key cryptography), etc. to be used in encrypting and/or decrypting data.

Figure 6:
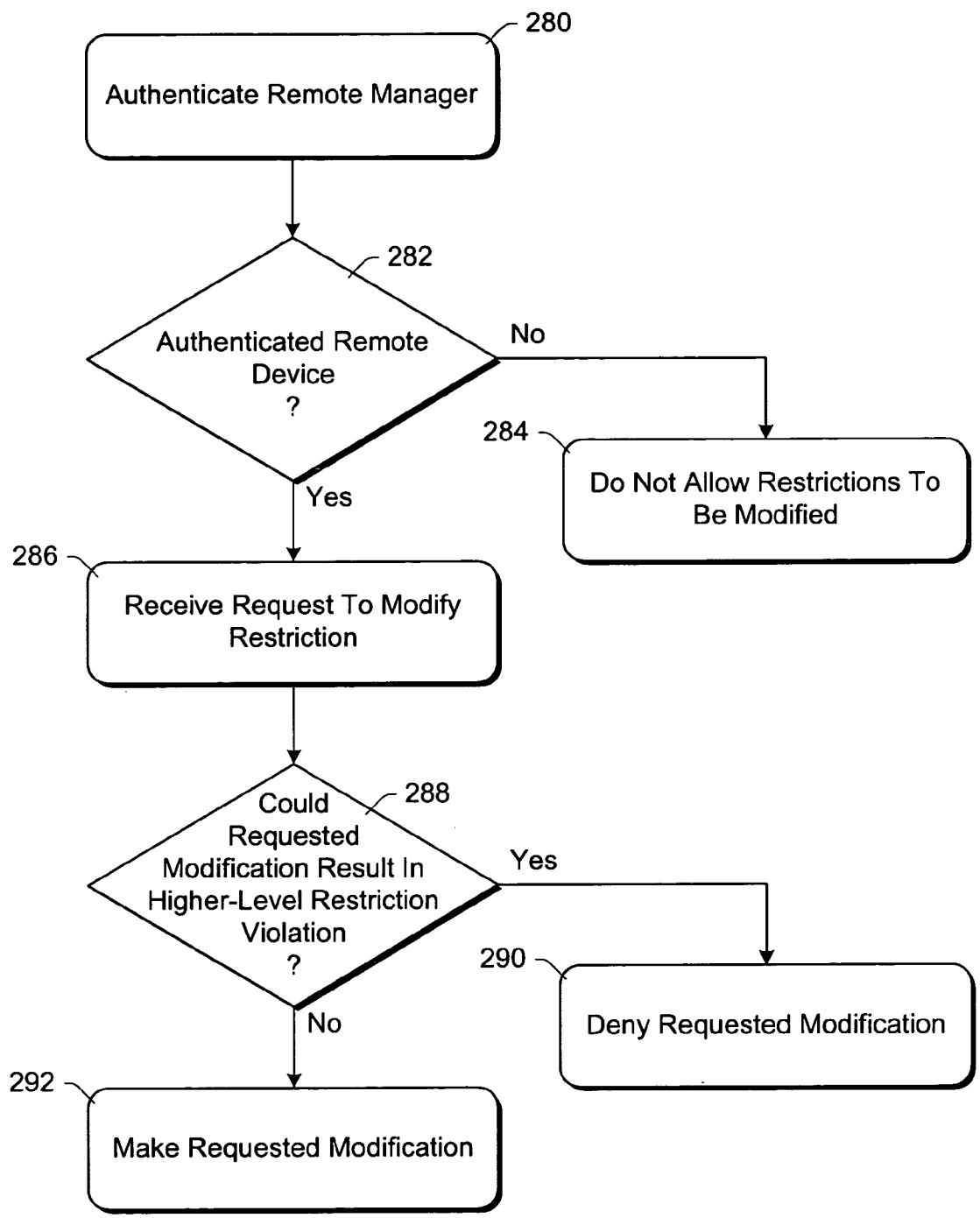
FIG. 6 is a flowchart illustrating an exemplary process for making modifications to restrictions in a network mediator in accordance with certain embodiments of the invention.

FIG. 6 is a flowchart illustrating an exemplary process for making modifications to restrictions in a network mediator in accordance with certain embodiments of the invention. The process of FIG. 6 is performed by a network mediator (such as mediator 108 or 110) and may be implemented in software.

Initially, the network mediator authenticates a remote manager (act 280). If the remote device attempting to be authenticated cannot be authenticated, then no modifications to the restrictions on the network mediator are allowed (acts 282 and 284). However, if the remote device can be authenticated, then a request to modify restrictions can be received by the network mediator (acts 282 and 286). A request to modify a restriction can be a request to modify a filter and/or virtualization data, such as to add a filter or virtualization data, remove a filter or virtualization data, modify the parameters of a filter or virtualization data, etc.

In response to the request to modify a restriction, the network mediator checks whether the requested modification could result in a violation of a higher-level restriction (act 288). If a violation could result, then the requested modification is denied (act 290). However, if a violation would not result, then the requested modification is made (act 292).

Figure 7:
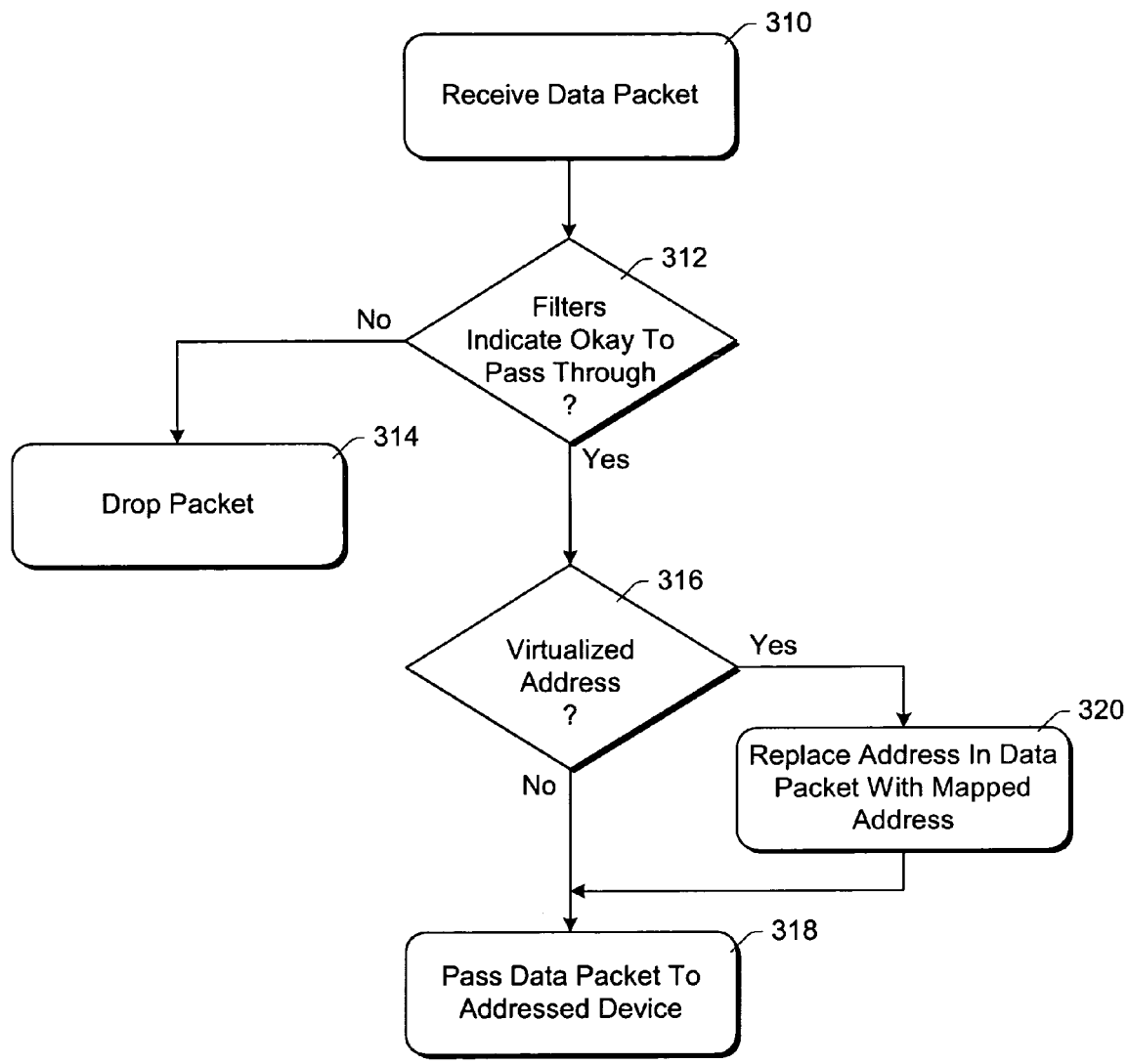
FIG. 7 is a flowchart illustrating an exemplary process for imposing restrictions on communications of a computing device in accordance with certain embodiments of the invention.

FIG. 7 is a flowchart illustrating an exemplary process for imposing restrictions on communications of a computing device in accordance with certain embodiments of the invention. The process of FIG. 7 is performed by a network mediator (such as mediator 108 or 110) and may be implemented in software.

Initially, a data packet is received at the network mediator (act 310). The received packet could be from the computing device corresponding to the network mediator and targeting some other computing device, or alternatively from some other computing device targeting the computing device corresponding to the network mediator. Alternatively, data packets in only one direction (e.g., from the computing device corresponding to the network mediator out to some other computing device, or from some other computing device targeting the computing device corresponding to the network mediator). Once received, the network mediator determines whether the filters indicate it is okay to pass the packet through to its target (act 312). If the filters indicate it is not okay to pass the packet, then the packet is dropped (act 314). The source of the packet may be informed that the packet was dropped, or alternatively may not be so informed.

However, if the filters indicate it is okay to pass the packet through to its target, then the network mediator checks whether virtualized addresses are being used, either for the network mediator as a whole, or alternatively on an individual per-address (or per-filter) basis (act 316). If there is no virtualized address for this packet, then the data packet is passed to the addressed device (act 318). However, if there is a virtualized address for this packet, then the network mediator replaces the address in the data packet with the mapped address (act 320). This replacement is either replacing a virtual address with a network address (in the case of a data packet being sent from the computing device corresponding to the network mediator), or replacing a network address with a virtual address (in the case of a data packet targeting the computing device corresponding to the network mediator).

In the discussion herein, embodiments of the invention are described in the general context of computer-executable instructions, such as program modules, being executed by one or more conventional personal computers (e.g., computing devices 102 and 104 of FIG. 1). Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, gaming consoles, Internet appliances, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs) or programmable logic devices (PLDs).

FIG. 8 shows a general example of a computer 342 that can be used in accordance with certain embodiments of the invention. Computer 342 is shown as an example of a computer that can perform the functions of a computing device 102 or 104 of FIG. 1, or node 210 of FIG. 4 or 5.

Computer 342 includes one or more processors or processing units 344, a system memory 346, and a bus 348 that couples various system components including the system memory 346 to processors 344. The bus 348 represents one or more of any of several types of bus structures, including a memory bus or memory controller, a peripheral bus, an accelerated graphics port, and a processor or local bus using any of a variety of bus architectures. The system memory includes read only memory (ROM) 350 and random access memory (RAM) 352. A basic input/output system (BIOS) 354, containing the basic routines that help to transfer information between elements within computer 342, such as during start-up, is stored in ROM 350.

Computer 342 further includes a hard disk drive 356 for reading from and writing to a hard disk, not shown, connected to bus 348 via a hard disk driver interface 357 (e.g., a SCSI, ATA, or other type of interface); a magnetic disk drive 358 for reading from and writing to a removable magnetic disk 360, connected to bus 348 via a magnetic disk drive interface 361; and an optical disk drive 362 for reading from or writing to a removable optical disk 364 such as a CD ROM, DVD, or other optical media, connected to bus 348 via an optical drive interface 365. The drives and their associated computer-readable media provide nonvolatile storage of computer readable instructions, data structures, program modules and other data for computer 342. Although the exemplary environment described herein employs a hard disk, a removable magnetic disk 360 and a removable optical disk 364, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 360, optical disk 364, ROM 350, or RAM 352, including an operating system 370, one or more application programs 372, other program modules 374, and program data 376. A user may enter commands and information into computer 342 through input devices such as keyboard 378 and pointing device 380. Other input devices (not shown) may include a microphone, joystick, game pad, satellite dish, scanner, or the like. These and other input devices are connected to the processing unit 344 through an interface 368 that is coupled to the system bus. A monitor 384 or other type of display device is also connected to the system bus 348 via an interface, such as a video adapter 386. In addition to the monitor, personal computers typically include other peripheral output devices (not shown) such as speakers and printers.

Computer 342 optionally operates in a networked environment using logical connections to one or more remote computers, such as a remote computer 388. The remote computer 388 may be another personal computer, a server, a router, a network PC, a peer device or other common network node, and typically includes many or all of the elements described above relative to computer 342, although only a memory storage device 390 has been illustrated in FIG. 8. The logical connections depicted in FIG. 8 include a local area network (LAN) 392 and a wide area network (WAN) 394. Such networking environments are commonplace in offices, enterprise-wide computer networks, intranets, and the Internet. In the described embodiment of the invention, remote computer 388 executes an Internet Web browser program (which may optionally be integrated into the operating system 370) such as the "Internet Explorer" Web browser manufactured and distributed by Microsoft Corporation of Redmond, Wash.

When used in a LAN networking environment, computer 342 is connected to the local network 392 through a network interface or adapter 396. When used in a WAN networking environment, computer 342 typically includes a modem 398 or other component for establishing communications over the wide area network 394, such as the Internet. The modem 398, which may be internal or external, is connected to the system bus 348 via an interface (e.g., a serial port interface 368). In a networked environment, program modules depicted relative to the personal computer 342, or portions thereof, may be stored in the remote memory storage device. It is to be appreciated that the network connections shown are exemplary and other means of establishing a communications link between the computers may be used.

Computer 342 also includes a broadcast tuner 400. Broadcast tuner 400 receives broadcast signals either directly (e.g., analog or digital cable transmissions fed directly into tuner 400) or via a reception device (e.g., via an antenna or satellite dish).

Generally, the data processors of computer 342 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the acts described herein in conjunction with a microprocessor or other data processor. The invention also includes the computer itself when programmed according to the methods and techniques described herein. Furthermore, certain sub-components of the computer may be programmed to perform the functions and steps described herein. The invention includes such sub-components when they are programmed as described. In addition, the invention described herein includes data structures as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computing device comprising:
a set of filters;
a mapping of virtual addresses to network addresses; and
a controller, coupled to the set of filters and the mapping, to,
access, upon receipt of a data packet requested to be sent from the computing device to a target device via a network, the set of filters and determine whether the data packet can be sent to the target device based on whether the computing device is allowed to communicate with the target device,
replace, based on the mapping, the target address in the data packet with a corresponding target network address;
forward the data packet to the target device at the target network address if it is determined the data packet can be sent to the target device;
prevent the computing device from modifying any of the filters in the set of filters, but allow the set of filters to be modified by a plurality of remote devices operating at a plurality of different managerial levels, a first of the plurality of remote devices being a cluster operations management console for managing hardware operations of the computing device, a second of the plurality of remote devices being an application operations management console for managing software operations of the computing device; and
prevent the application operations management console from adding any filters to the set of filters that are less restrictive than filters added by the cluster operations management console.

2. A computing device as recited in claim 1, wherein the controller is to make the computing device aware of the virtual addresses in the mapping but to hide the network addresses in the mapping from the computing device.

3. A computing device as recited in 1, further comprising allowing the set of filters to be modified by a lower managerial level remote device only if the modifications are not less restrictive than modifications imposed by a higher managerial level remote device.

4. A computing device as recited in claim 1, the computing device including a processor that supports multiple privilege levels, and the controller being implemented in a most privileged level of the multiple privilege levels.

5. A method comprising:
maintaining, at a computing device, a set of filters that restrict the ability of the computing device to communicate with other computing devices;
allowing the set of fitters to be modified by a plurality of remote devices operating at a plurality of different managerial levels, the plurality of remote devices including a cluster operations management device for managing hardware operations of the computing device, and an application operations management device for managing software operations of the computing device;

preventing the application operations management device from adding any filters to the set of filters that are less restrictive than filters added by the cluster operations management device; and preventing the computing device from modifying the set of filters.

6. A method as recited in claim 5, wherein restriction of the ability of the computing device to communicate with other computing devices comprises restricting the computing device from transmitting data packets to one or more other computing devices.

7. A method as recited in claim 5, wherein modification of the set of filters includes one or more of: adding a new filter to the set of filters, deleting a filter from the set of filters, and changing one or more parameters of a filter in the set of filters.

8. A method as recited in claim 5, wherein one or more filters in the set of filters restrict one or more of the transmission of data packets of a particular type from the computing device and reception of data packets of a particular type at the computing device.

9. A method as recited in claim 5, wherein one or more filters in the set of filters restrict one or more of the transmission of Internet Protocol (IP) data packets from the computing device and reception of IP data packets at the computing device based on one or more of: a source address, a destination IP address, a source port, a destination port, and a protocol.

10. A method as recited in claim 5, wherein one or more filters in the set of filters identifies that a data packet targeting a particular address can be transmitted from the computing device to the addressed device, and further identifies a new address that the particular address from the data packet is to be changed to prior to being communicated to the addressed device.

11. A method as recited in claim 5, wherein one of the filters in the set of filters is a permissive filter that indicates a data packet can be passed to its targeted destination device if the data packet parameters match corresponding parameters of the filter.

12. A method as recited in claim 5, wherein one of the filters in the set of filters is an exclusionary filter that indicates a data packet cannot be passed to its targeted destination device if the data packet parameters match corresponding parameters of the filter.

13. A method as recited in claim 5, wherein each filter includes a plurality of filter parameters, and wherein each of the plurality of filter parameters can include wildcard values.

14. A method as recited in claim 5, wherein the set of filters restrict the ability of the computing device to communicate with other computing devices on a per-data packet basis, wherein each filter includes a plurality of filter parameters, and wherein each filter parameter includes a filter value and a mask value indicating which portions of the filter value must match a corresponding parameter in a data packet for the data packet to satisfy the filter.

15. One or more computer-readable memories containing a computer program that is executable by a processor to perform the method recited in claim 5.

16. A network mediator comprising:

a set of filters; and a controller, coupled to the set of filters, to, access, upon receipt of a data packet requested to be sent from a computing device to a target device via a network, the set of filters and determine whether the data packet can be sent to the target device based on whether the computing device is allowed to communicate with the target device, prevent the computing device from modifying any of the filters in the set of filters but allow the set of filters to be modified by a remote cluster operations management console for managing hardware operations of the computing device and by a remote application operations management console for managing software operations of the computing device, and prevent the remote application operations management console from modifying the set of filters to be less restrictive than filters added by the remote cluster operations management console.

17. A network mediator as recited in claim 16, wherein the controller is further to access, upon receipt of another data packet from another target device via the network, the set of filters and determine whether the data packet can be received at the computing device based on whether the computing device is allowed to receive communications from the other target device.

18. A network mediator as recited in claim 16, wherein the modifying the set of filters includes one or more of: adding a new filter to the set of filters, deleting a filter from the set of filters, and changing one or more parameters of a filter in the set of filters.

19. A network mediator as recited in claim 16, wherein the network mediator is coupled to the computing device.

20. A network mediator as recited in claim 16, wherein the computing device includes the network mediator.

21. A network mediator as recited in claim 16, wherein each filter in the set of filters includes a plurality of filter parameters, and wherein each filter parameter includes a filter value and a mask value indicating which portions of the filter value must match a corresponding parameter in the data packet for the data packet to satisfy the filter.

22. A network mediator as recited in claim 21, wherein the controller is to allow the data packet to be forwarded to the target device if the data packet satisfies the filter.

23. A network mediator as recited in claim 21, wherein the controller is to prevent the data packet from being forwarded to the target device if the data packet satisfies the filter.

24. A method comprising:

maintaining a set of filters that restrict the ability of a computing device to communicate with other computing devices;

allowing multiple remote computing devices, each corresponding to a different managerial level, to modify the set of filters, the multiple remote computing devices including a cluster operations management device for managing hardware operations of the computing device, and an application operations management device for managing software operations of the computing device; and preventing the application operations management device from modifying the set of filters in a manner that would result in a violation of a filter added by the cluster operations management device.

25. A method as recited in claim 24, wherein the preventing comprises:

receiving a request from the application operations management device to modify the set of filters;

determining whether the request to modify would result in a violation of a filter previously added to the set of filters by the cluster operations management device; and performing the request to modify when the request to modify would not result in a violation, and otherwise not performing the request to modify.

26. A method as recited in 25, wherein the request to modify comprises one or more of: adding a filter to the set of filters, modifying a filter in the set of filters, and deleting a filter from the set of filters.

27. A method as recited in claim 24, wherein the violation occurs when the request to modify would result in a filter being less restrictive than the filter added by the cluster operations management device.

28. A method as recited in claim 24, further comprising preventing the computing device from modifying the set of filters.

29. A method as recited in claim 24, wherein the set of filters restrict the ability of the computing device to communicate with other computing devices on a per-data packet basis, wherein each filter includes a plurality of filter parameters, and wherein each filter parameter includes a filter value and a mask value indicating which portions of the filter value must match a corresponding parameter in a data packet for the data packet to satisfy the filter.

30. One or more computer-readable memories containing a computer program that is executable by a processor to perform the method recited in claim 24.

31. One or more computer-readable media having stored thereon a computer program to implement a multiple-level filter administration scheme and including a plurality of instructions that, when executed by one or more processors, causes the one or more processors to perform acts including:

allowing a cluster operations management device for managing hardware operations of a filtered device to modify a set of filters corresponding to the filtered device, the cluster operations management device operating at a first of the multiple levels; and allowing an application operations management device for managing software operations of the filtered device to modify the set of filters only if the modification is at least as restrictive as the filters imposed by the first computing device, the application operations management device operating at a second of the multiple levels.

32. One or more computer-readable media as recited in claim 31, wherein the plurality of instructions further include instructions that, when executed by the one or more processors, causes the one or more processors to perform acts including allowing the cluster operations management device to remove a filter from the set of filters imposed by the cluster operations management device but not allowing the application operations management device to remove the filter.

33. One or more computer-readable media as recited in claim 31, wherein allowing the cluster operations management device or the application operations management device to modify the set of filters comprises one or more of: adding a new filter to the set of filters, removing a filter from the set of filters, and changing parameters of a filter in the set of filters.

34. One or more computer-readable media as recited in claim 31, wherein the plurality of instructions further include instructions that, when executed by the one or more processors, causes the one or more processors to perform acts including preventing the filtered device from modifying the set of filters.

35. A method comprising:

maintaining an association of virtual addresses and corresponding network addresses;

making a computing device aware of the virtual addresses;

hiding the network addresses from the computing device;

receiving, from the computing device, a data packet intended for a target computing device corresponding to a target virtual address;

replacing, based on the target virtual address, the target virtual address with the corresponding target network address;

forwarding the data packet to the target computing device at the target network address;

maintaining, at the computing device, a set of filters that further restrict the ability of the computing device to communicate with other computing devices;

allowing the set of filters to be modified from a plurality of remote devices, the plurality of remote devices including a cluster operations management device for managing hardware operations of the computing device and an application operations management device for managing software operations of the computing device;

preventing the application operations management device from modifying the set of filters in a manner that would result in a violation of a filter added by the cluster operations management device; and preventing the computing device from modifying the set of filters.

36. A method as recited in claim 35, wherein the replacing comprises performing the replacing transparent to the computing device.

37. A method as recited in claim 35, further comprising:

receiving, from a source device, another data packet that is intended for the computing device, wherein the other data packet includes a network address of the source device; and replacing, based on the network address of the source device, the network address of the source device with a corresponding virtual address.

38. One or more computer-readable memories containing a computer program that is executable by a processor to perform the method recited in claim 35.

39. A network mediator comprising:

a mapping of virtual addresses to network addresses;

a set of filters that restrict the ability of the computing device to communicate with other computing devices; and a controller, coupled to the mapping, to, make a corresponding computing device aware of the virtual addresses, hide the network addresses from the computing device, receive, from the computing device, a data packet intended for a target computing device corresponding to a target virtual address, replace, based on the target virtual address, the target virtual address with the corresponding target network address, forward the data packet to the target computing device at the target network address, allow the set of filters to be modified from a plurality of remote devices, the plurality of remote devices including a cluster operations management device for managing hardware operations of the computing device and an application operations management device for managing software operations of the computing device, prevent the application operations management device from modifying the set of filters in a manner that would result in a violation of a filter added by the cluster operations management device, and prevent the computing device from modifying the set of filters.

40. A network mediator as recited in claim 39, wherein the network mediator is communicatively coupled to the computing device.

41. A network mediator as recited in claim 39, wherein the computing device includes the network mediator.

* * * * *

UNITED STATES PATENT AND TRADEMARK OFFICE
CERTIFICATE OF CORRECTION

| | | |
|---|---|---|
| PATENT NO. | : 7,093,288 B1 | Page 1 of 1 |
| APPLICATION NO. | : 09/695821 | |
| DATED | : August 15, 2006 | |
| INVENTOR(S) | : Aamer Hydrie et al. | |

It is certified that error appears in the above-identified patent and that said Letters Patent is hereby corrected as shown below:

On the title page, in "Assistant Examiner", in column 2, line 1, delete "Shih-Hon" and insert -- Shin-Hon --, therefor.

On page 2, item (56), under "U.S. Patent Documents", in column 2, line 24, after "2/2003" delete "Beadies" and insert -- Beadles --, therefor.

On page 2, item (56), under "U.S. Patent Documents", in column 2, line 27, after "8/2003" delete "Beadies" and insert -- Beadles --, therefor.

On page 2, item (56), under "Other Publications", in column 2, line 11, delete "Pankah" and insert -- Pankaj --, therefor.

On page 2, item (56), under "Other Publications", in column 2, line 12, delete "Distrubuted" and insert -- Distributed --, therefor.

In column 18, line 50, in Claim 3, after "recited in" delete "1," and insert -- claim 1, --, therefor.

In column 18, line 63, in Claim 5, delete "fitters" and insert -- filters --, therefor.

Signed and Sealed this

Twentieth Day of July, 2010

David J. Kappos
*Director of the United States Patent and Trademark Office*